(12) United States Patent
Gogolev et al.

(10) Patent No.: US 11,929,936 B2
(45) Date of Patent: Mar. 12, 2024

(54) INTERFACE APPARATUS BETWEEN TSN-DEVICES AND NON-TSN-DEVICES

(71) Applicant: ABB Schweiz AG, Baden (CH)

(72) Inventors: Alexander Gogolev, Mannheim (DE); Marius-Petru Stanica, Bensheim (DE); Thomas Gamer, Bruehl (DE)

(73) Assignee: ABB Schweiz AG, Baden (CH)

( * ) Notice: Subject to any disclaimer, the term of this patent is extended or adjusted under 35 U.S.C. 154(b) by 60 days.

(21) Appl. No.: 17/176,195

(22) Filed: Feb. 16, 2021

(65) Prior Publication Data

US 2021/0258264 A1 Aug. 19, 2021

(30) Foreign Application Priority Data

Feb. 17, 2020 (EP) .................................... 20157744

(51) Int. Cl.
*H04L 47/6275* (2022.01)
*H04L 27/26* (2006.01)

(52) U.S. Cl.
CPC ...... *H04L 47/6275* (2013.01); *H04L 27/2682* (2013.01)

(58) Field of Classification Search
None
See application file for complete search history.

(56) References Cited

U.S. PATENT DOCUMENTS

| 10,044,524 B1 | 8/2018 | Edelhaus et al. |
| 2018/0248980 A1 | 8/2018 | Götz et al. |
| 2019/0289616 A1 | 9/2019 | Hampel et al. |
| 2020/0259896 A1* | 8/2020 | Sachs ..................... H04J 3/0667 |
| 2020/0322461 A1 | 10/2020 | Götz et al. |
| 2020/0329441 A1* | 10/2020 | Ha ......................... H04L 43/106 |
| 2021/0144666 A1* | 5/2021 | Sivasiva Ganesan ...................... H04W 56/0015 |

FOREIGN PATENT DOCUMENTS

| CN | 1848806 A | 10/2006 | |
| CN | 104052574 A | 9/2014 | |
| CN | 108781191 A | 11/2018 | |
| CN | 109691038 A | 4/2019 | |
| CN | 110024339 A | 7/2019 | |
| EP | 3461086 A1 | 3/2019 | |
| WO | WO 2017092879 A1 | 6/2017 | |
| WO | WO 2019166081 A1 | 9/2019 | |
| WO | WO-2021037837 A1 * | 3/2021 | ............. H04L 12/46 |

* cited by examiner

*Primary Examiner* — Rebecca E Song
(74) *Attorney, Agent, or Firm* — Leydig, Voit & Mayer, Ltd.

(57) ABSTRACT

A method for transmitting a first data packet from a receiving input-buffer to a receiving output-buffer, the first data packet in the receiving input-buffer having a non-TSN format and the first data packet in the receiving output-buffer being TSN-compliant, includes the steps of: analysing the first data packet, which has been retrieved from a non-TSN device, in the receiving input-buffer; adding a first data packet time to the first data packet according to a Precision Time Protocol (PTP); adding a predefined first data packet priority level to the first data packet according to a Priority Code Point (PCP) of an 802.1Q tag; transmitting the first data packet to the receiving output-buffer; and sending the first data packet according to the first data packet priority level to a TSN-compliant device.

12 Claims, 6 Drawing Sheets

INTERFACE APPARATUS BETWEEN TSN-DEVICES AND NON-TSN-DEVICES

CROSS-REFERENCE TO PRIOR APPLICATION

Priority is claimed to European Patent Application No. EP 20 157 744.2, filed on Feb. 17, 2020, the entire disclosure of which is hereby incorporated by reference herein.

FIELD

The invention relates to the field of communication technologies, particularly for Time-Sensitive Networks (TSN). The invention further relates to a method, to an interface, to a system, to a computer program product, and to a use.

BACKGROUND

Time-Sensitive Networks (TSN), which have been (and still are) standardized by IEEE, may be used, for instance, for implementing parts of the so-called Industry 4.0 concept. The properties of Time-Sensitive Networks may contribute for using those networks, e.g., for communication and/or as a communication layer for automation systems. However, since many legacy automation systems still use non-TSN devices, such as end-devices and/or gateways, it may become an issue to cooperate between a TSN-core (or a TSN network) and non-TSN devices within an automation system.

SUMMARY

In an embodiment, the present invention provides a method for transmitting a first data packet from a receiving input-buffer to a receiving output-buffer, the first data packet in the receiving input-buffer having a non-TSN format and the first data packet in the receiving output-buffer being TSN-compliant, the method comprising the steps of: analysing the first data packet, which has been retrieved from a non-TSN device, in the receiving input-buffer; adding a first data packet time to the first data packet according to a Precision Time Protocol (PTP); adding a predefined first data packet priority level to the first data packet according to a Priority Code Point (PCP) of an 802.1Q tag; transmitting the first data packet to the receiving output-buffer; and sending the first data packet according to the first data packet priority level to a TSN-compliant device.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 3a schematically shows a first data packet according to an embodiment;

FIG. 3b schematically shows a second data packet according to an embodiment;

DETAILED DESCRIPTION

Figure 1:
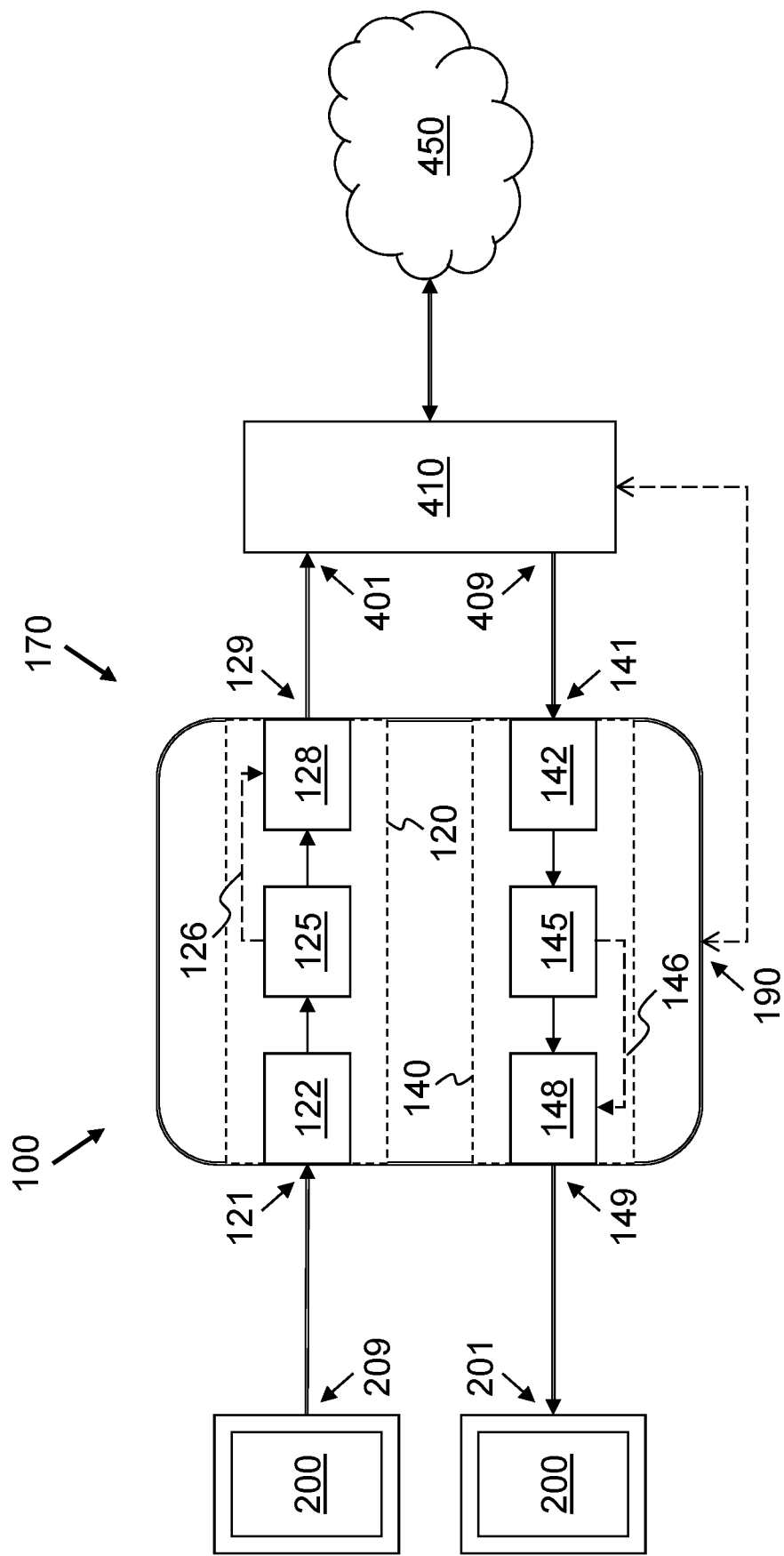
FIG. 1 schematically shows a configuration with non-TSN devices and a TSN network according to an embodiment.

In embodiment, the present invention provides concepts, methods, and/or apparatuses that support at least some TSN properties, in order to make at least some non-TSN devices ready for communication to and/or in TSN networks.

One aspect relates to a method for transmitting a first data packet from a receiving input-buffer to a receiving output-buffer, wherein the first data packet in the receiving input-buffer has a non-TSN format and the first data packet in the receiving output-buffer is TSN-compliant.

The notion "TSN" relates to so-called Time-Sensitive Networks, which are standardized, e.g., in the IEEE 802.1Q specification. Hence, the first data packet in the receiving output-buffer is TSN-compliant, if at least those features (or a specified subset of features) are supported, which are relevant for a predefined or specified application. Consequently, there is no need for the first data packet in the receiving output-buffer to fulfil a complete set of TSN specifications. The buffers, e.g. the receiving input-buffer and/or the receiving output-buffer, may be implemented as dedicated buffers, e.g. as a part of a FIFO-buffer system, the buffers may be implemented as one single buffer, where modifications are applied, the buffers may be implemented as "on the fly" buffers, which only exist in registers of a processor—for instance a general purpose processor, a network processor, and/or another type of processor —, and/or other implementations.

The method comprises a step: Analysing the first data packet, which has been retrieved from a non-TSN device, in the receiving input-buffer. The format of the first data packet may depend on the non-TSN device, from which the data packet has been retrieved. The non-TSN device may be an end-device and/or a gateway. The non-TSN device may be part of an automation system. The non-TSN device may support and/or may (at least partly) be compatible to Ethernet and/or fieldbus protocols. The first data packet may comprise measurement data, control data, headers, and/or other kind of data. The analysing may consider at least a part of the first data packet. The analysing may comprise to forward, to delete, and/or to change at least some of the data.

The method comprises a further step: Adding a first data packet time to the first data packet according to a Precision Time Protocol, PTP. PTP uses a special type of packets, independent from regular data packets. They carry the timing information between PTP-aware devices to get them to sync. Meanwhile, regular data packets have no PTP timing information anywhere in their headers/footers. A control application could timestamp its control data, e.g., variables, but this will happen in the payload of the regular data packet, which is unchanged. This may be done according to the IEEE 802.1AS-2011 and/or IEEE 802.1AS-2020 (".1AS") specification. The .1AS clock synchronization (clock sync) is sometimes considered as an evolution of the Precision Time Protocol according to IEEE1588, and thus has compatible time format. However, some embodiments may have an incompatible Best Master Clock Algorithm. At least some fieldbuses, e.g. Profinet, may be implemented by using the same PTP master-slave function, where master role is assigned to .1AS and/or makes use of externally managed sync-trees. Others, e.g. EtherCat, may have an interface to PTP, and it can be reused, with the same master role assigned to .1AS clock and/or make use of externally managed sync-trees. The .1AS-to-non-.1AS clock transformation may be realized in software with use of specific hardware; .1AS may use both. One kind of approach may comprise to feed the .1AS synchronized time value into a "non-.1AS" network, so that it "pulls" the local clock to .1AS value.

In other words, synchronized, PTP-incompatible networks (including the solutions using the same time format, e.g., TTEthernet) may be connected to the .1AS TSN domain, possibly using some specific software. With such a software, the clock in the former network may be driven by the .1AS clock, unless otherwise specified; i.e. a "master-slave" relationship may be reversed if, for instance, the former network runs a high-precision atomic clock. Networks like, e.g., TTEthernet and Ethercat have such kind of software, which allows them to synchronize to other PTP-compatible networks.

For fieldbuses and/or other non-synchronized industrial Ethernet solutions without the clock sync, a missing timing information may be omitted, leaving the TSN part as the only synchronized one. Thus, such kind of systems may be connected to a connection system with no additional functionality: the TSN side the network may be synchronized using .1AS clock, the other side may be kept unchanged, and/or may use internal mechanisms for application-level synchronized execution.

The method comprises a further step: Adding a predefined first data packet priority level to the first data packet according to a Priority Code Point, PCP, of an 802.1Q tag. For at least some protocols, the adding may comprise or consist of setting the first data packet priority level. The priority level may depend on the end-device or "end station". The implementation of this step may take into account that TSN uses the VLAN PCP field for traffic shaping. The VLAN PCP field is a 3-bit field which refers to the IEEE 802.1p class of service and specifies 8 levels of traffic prioritization. As an example, Profinet RT/IRT also uses a PCP field with a value fixed to "6". Thus, on the TSN portion of the network the same priority level can be used, or re-configured to any other user-defined level out of a range between 0 and 7, according to a specified functionality, i.e. following a standardized scheme, as described, e.g., in IEEE/IEC 60802, or based on a user preference and/or specification. As a further example, Ethercat reuses the Ethernet header format, so prioritization can be configured with inserting the VLAN tag, and respective VLAN ID and PCP, based on user intentions and system design. For other fieldbuses that use no QoS distinction the adaptation may be similar. In other words, industrial Ethernet solutions may be divided into those who use VLAN PCP (e.g., Profinet RT/IRT also use), and those that do not (EtherCat, Modbus TCP, etc.). This differentiation influences the design and/or implementation details of the interface.

The method comprises a further step: Transmitting the first data packet to the receiving output-buffer. The transmitting may depend on the implementation of the buffers (see above).

The method comprises a further step: Sending the first data packet according to the first data packet priority level to a TSN-compliant device. The sending may comprise IEEE 802.1Qbv Enhancements to Traffic Scheduling ("Qbv scheduling", for instance according to IEEE 802.1Q-2018). TSN uses highly granular Qbv scheduling, which can, e.g. for Profinet, advantageously accommodate any requirement of the Profinet RT/IRT schedules and may at least in some embodiments even exceed its performance. This may ease the implementation of the Profinet schedules, i.e. this may require minor (or even no) modifications. Similar benefits may apply to at least some other scheduled fieldbuses. Fieldbuses without schedules may be implemented using Qbv considering system requirements to ensure uninterrupted service for critical traffic. Furthermore, frame preemption (Qbu/Qbr) may be used in certain cases to simplify system configuration instead of Qbv. Using this may depend on specified requirements and/or expected or estimated performance of the frame preemption on the network.

This method advantageously provides means to enable TSN communication for non-TSN automation products. This method may be implemented in a way that provides transparent interfacing of the existing ("legacy" or proprietary) network technologies—such as at least some types of fieldbuses—to a TSN network. Hence, existing automation products may be used with a network that is based and/or implements a so-called Industry 4.0 concept with little or no modifications. This further gives room for a gradual TSN enablement, e.g. with simple devices supporting a feature set with a "minimal-specification" up to fast and complex devices supporting the "full-specification". The benefits of a gradual approach—which is made viable by this method—may include cost savings on TSN enablement and/or longer useful life for the systems in use. Form at least some existing products and systems, this may provide means for a seamless TSN integration.

One aspect relates to a method for transmitting a second data packet from a sending input-buffer to a sending output-buffer, wherein the second data packet in the sending input-buffer is TSN-compliant and the second data packet in the sending output-buffer has a non-TSN format.

The method comprises a step: Analysing the second data packet, which has been retrieved from a TSN-compliant device, in the sending input-buffer, wherein the second data packet comprises at least a second data packet time and a second data packet priority level. The analysing may consider further fields of the TSN-compliant second data packet. "TSN-compliant" for this method (and the above one) may not necessarily mean a "full-blown" TSN-compliance, but may be limited for feature in a specified network (and/or sub-network).

The method comprises a step: Acknowledging the second data packet according to the second data packet priority level. The "acknowledging" may comprise IEEE 802.1Qbv Enhancements to Traffic Scheduling. Furthermore, frame preemption (Qbu/Qbr) may be used in certain cases to simplify system configuration instead of Qbv.

The method comprises a step: Modifying the second data packet priority level from the second data packet according to the Priority Code Point, PCP. For at least some kind of non-TSN formats, the "modifying" may include a format change, a change of the semantics, or a removing of this information.

The method comprises a step: Modifying the second data packet time from the second data packet according to the Precision Time Protocol, PTP. For at least some kind of non-TSN formats, the "modifying" may include a format change, a change of the semantics, or a removing of this information.

The method comprises a step: Transmitting the second data packet to the sending output-buffer. The transmitting may depend on the implementation of the buffers (see above).

The method comprises a step: Sending the second data packet to a non-TSN device. The Implementation of the sending may include further modifications to comply with to the non-TSN "target" protocol.

This method may be considered as an "anti-parallel" or supplementing method w.r.t. to the method described above. Hence, the definitions pointed out above also apply to this method. Along with the method described above, this method may contribute to a bidirectional communication of TSN device(s) with non-TSN device(s). Accordingly, a combination of these methods may advantageously support the benefits sketched above in both directions.

One aspect relates to an interface between a communication layer of a Time-Sensitive Network, TSN, device and a communication layer of a non-TSN device. The interface comprises at least one of:

A receiving interface sub-device for transmitting a first data packet from a receiving input-buffer to a receiving output-buffer by means of a first transforming sub-device, wherein the first transforming sub-device is configured to execute a method as described above and/or below; and/or A sending interface sub-device for transmitting a second data packet from a sending input-buffer to a sending output-buffer by means of a second transforming sub-device, wherein the second transforming sub-device is configured to execute a method as described above and/or below.

The interface may consist of only one sub-device, e.g. in case of a unidirectional interface, or may comprise both of them. The interface may comprise further sub-devices, e.g. for configuration, control, other OAM (Operation, Administration and Maintenance) purposes, and/or to comply with further specifications, e.g. concerning automation.

The first and/or the second transforming sub-device may be implemented in hardware, firmware, software, and/or a combination of these. These sub-devices may comprise a standard-processor, a specialized and/or embedded processor, an FPGA (Field Programmable Gate Array), and/or other devices. The second data packet may have been retrieved from a TSN device. The first data packet may have been retrieved from a non-TSN device. The non-TSN device may include an end-device and/or gateway supporting, e.g., industrial Ethernet "non-IEEE 802.3 fieldbuses" and/or to IEEE 802.1 and IEEE 802.3 standard specifications.

In various embodiments, the non-TSN protocol is one of: Profinet, EtherCat, Powerlink, TTEthernet, Ethernet/IP, and/or Modbus TCP protocol. This may include fieldbuses that comply with IEEE 802.3 frame format to some extent, i.e. not necessarily completely, such as Pfinet, EtherCat, similar ones and/or fieldbuses based on proprietary industrial Ethernet protocol. For those, the interface may provide and/or exchange features like .1AS clock sync, QoS with 8 levels of priorities, precise traffic scheduling (e.g. Qbv) as described above and/or below.

In some embodiments, the first data packet in a receiving output-buffer of the receiving interface sub-device is assigned a predefined first data packet priority level of 6. This priority level is specified as "internetwork control" and may, thus, provide a high amount of flexibility even for complex networks.

In various embodiments, the interface further comprises a clock-synchronisation to a non-TSN device that is configured to receive the second data packet from the sending output-buffer, wherein the clock-synchronisation to a device is performed by means of a PTP master-slave function. This may contribute to use the interface for a broad range of TSN-based networks for an automation system.

In various embodiments, the interface further comprises a real-time capable arbitration system towards a TSN device, wherein the arbitration system is TSN-compliant. The notion "arbitration system" is to be understood broadly, i.e. it may comprise a Qbv (and/or other) scheduling implementations. This may include means in further communication layers. This may further broaden the interface's application range.

In various embodiments, the interface further comprises a configuration interface, wherein the configuration interface is designed for configuring the receiving interface sub-device and/or the sending interface sub-device. This may be used for remote control of operation, administration, and/or maintenance of the automation system.

One aspect relates to a system for providing a connection between a TSN-compliant device and a non-TSN device. The system comprises:
  at least one TSN port,
  at least one non-TSN port, and
  an interface as described above and/or below.

The TSN port and/or the non-TSN port may be designed to connect and may include means to connect the TSN port to TSN device(s) or non-TSN device(s), respectively. Exemplary implementations may comprise:

A standalone device that connects to an existing end-device or end-station via the non-TSN port, for example to a fieldbus interface, such as Ethercat, Profinet, etc. This advantageously offers more flexibility in terms of enabling the already deployed networked end devices with TSN.

A plug-in slot extension for an end-device or end-station, possibly providing additional TSN ports also for neighbouring devices. This may be well-suited when a single device has a slot for a network extension card (thus enabling the device itself with TSN), additionally providing TSN capabilities to nearby devices, using available free slots.

An embedded extension to the end device that replaces its communication HW. This is suited for devices in development (upgrade) and can reduce the cost of TSN enablement.

This variety of "form factors" may further increase the efficiency of integration for different field installations. Further "form factors" may be developed for further devices.

The system may also support a variety of functional variants. Examples may comprise:

A system supporting a "minimal specification": This may comprise VLAN capabilities as required by QoS and a configuration interface (and/or a TSN-specific configuration interface), e.g., in software.

A system supporting an "advanced specification": This may add Credit-Based Shaping and .1CB seamless redundancy to the "minimal specification".

A system supporting a "full specification": This may add IEEE802.1AS time synchronization and .1Qbv for real-time traffic handling to the "advanced specification".

Advantageously, this variety may correspond to different types of existing end devices and provide respective TSN enhancements and/or may support the defined functionality of different types of end-stations. Thus, simple devices that require weak or no real-time guarantees may use a system supporting the "minimal specification", while faster and more powerful devices may use a system supporting the "full specification". This provides a high flexibility in variants to be delivered, thus supporting a broad range of automation systems. Furthermore, such a distinction enables the cost reduction in mass production and accelerates the TSN enablement for all types of end devices in a plug-and-play manner.

One aspect relates to a use of an interface described above and/or below or a system described above and/or below for connecting a non-TSN device to a TSN that supports TSN-compliant networking.

One aspect relates to a computer program product including computer program code for controlling one or more processors and/or controller(s) configured to perform a method as described above and/or below for conducting a measurement inside a passage at a predefined location.

One aspect relates to a computer-readable storage medium where a computer program or a computer program product as described above is stored on.

The reference symbols used in the drawings, and their meanings, are listed in summary form in the list of reference symbols. In principle, identical parts are provided with the same reference symbols in the figures.

FIG. 1 schematically shows a configuration with non-TSN devices 200 and a TSN network 450 according to an embodiment. The configuration comprises a connection system 170, implemented as a standalone device, which connects non-TSN devices 200 to a TSN gateway 410 that may be connected to a TSN network 450 and/or may be a part of it. In this figure, the non-TSN devices 200 are depicted as unidirectional devices. This is for better visualization and explanation and not to limit the scope of the invention. Real non-TSN devices 200 may comprise devices with unidirectional, with bidirectional interfaces and/or ports and/or with a plurality of them.

The connection system 170 has a TSN port 129, which is connected to a TSN gateway input port 401 of the TSN gateway 410. The TSN port 129 is configured to send a first data packet 520 (see FIG. 3a) to the TSN gateway input port 401. TSN gateway output port 409 of the TSN gateway 410 is configured to send a second data packet 540 (see FIG. 3b) to TSN port 141 of the connection system 170. Furthermore, an upper non-TSN device 200 is configured to send the first data packet 520 to a non-TSN port 121, and a lower non-TSN device 200 is configured to receive the second data packet 540 via non-TSN port 201 from non-TSN port 149.

The connection system 170 has an interface 100, which comprises a receiving interface sub-device 120 and a sending interface sub-device 140. The receiving interface sub-device 120 is configured for transmitting the first data packet 520 from a receiving input-buffer 122 to a receiving output-buffer 128. This is achieved by means of a first transforming sub-device 125, which transforms the first data packet 520 from a non-TSN format in the receiving input-buffer 122 to a TSN format in the receiving output-buffer 128. In addition, the first transforming sub-device 125 controls, via first control interface 126, the receiving output-buffer 128 and/or the TSN port 129. Analogously, the sending interface sub-device 140 is configured for transmitting a second data packet 540 from a sending input-buffer 142 to a sending output-buffer 148 by means of a second transforming sub-device 145. The transforming sub-device 145 further controls, via second control interface 146, the sending output-buffer 148 and/or the non-TSN port 149. Alternatively, a connection system 170 may only comprise one of: the receiving interface sub-device 120 and a sending interface sub-device 140. Such an apparatus only works for unidirectional messages.

The connection system 170 further comprises a configuration interface 190. The configuration interface 190 may, for instance, be used for remote control of operation, administration, and/or maintenance of the automation system. The configuration interface 190 may be connected to the TSN gateway 410 and/or to other servers or devices that are capable to support at least some of the features of the configuration interface 190.

Figure 2:
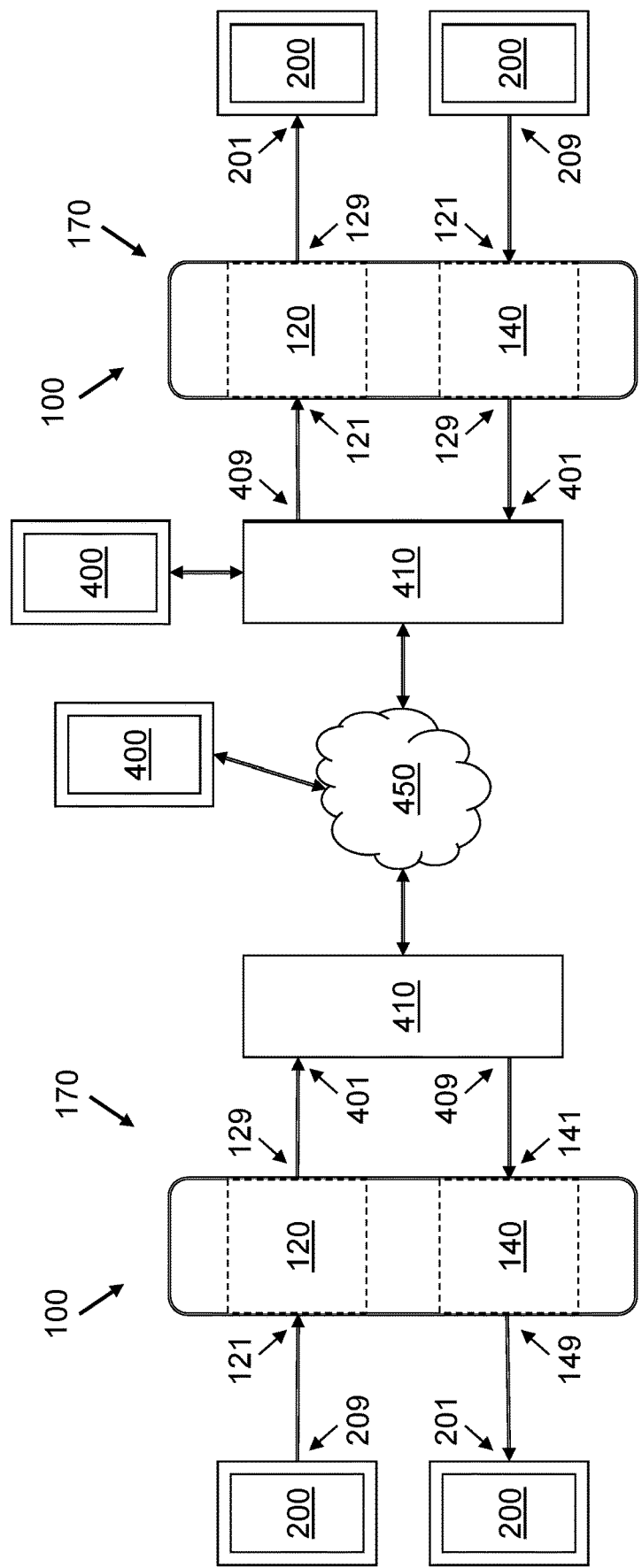
FIG. 2 schematically shows a further configuration with non-TSN devices and a TSN network according to a further embodiment.

FIG. 2 schematically shows a further configuration with non-TSN devices 200 and a TSN network 450 according to a further embodiment. The left side of FIG. 2 depicts essentially the same configuration as FIG. 1. For better clarity, some details of receiving interface sub-device 120 and sending interface sub-device 140 are not shown. FIG. 2 clearly shows how one part of an automation system with non-TSN devices 200 (e.g. the left one) is connected to and interacts with another part of an automation system with non-TSN devices 200 (e.g. the right one). In addition, one TSN device 400 is connected to the automation system via TSN gateway 410. Another TSN device 400 is connected directly to the TSN network 450.

FIG. 3a schematically shows a first data packet 520 according to an embodiment. The first data packet 520 at least comprises packet time 522 and priority level 524, which are added or modified by the first transforming sub-device 125 (see FIG. 1). The first data packet 520 may additionally comprise a header 521, a footer 529, and data 526, for example measurement data, control data, headers, and/or other kind of data.

FIG. 3b schematically shows a second data packet 540 according to an embodiment. The second data packet 540 at least comprises packet time 542 and priority level 544, which are added or modified by the second transforming sub-device 145 (see FIG. 1). The second data packet 540 may additionally comprise a header 541, a footer 549, and data 546, for example measurement data, control data, headers, and/or other kind of data.

Figure 4:
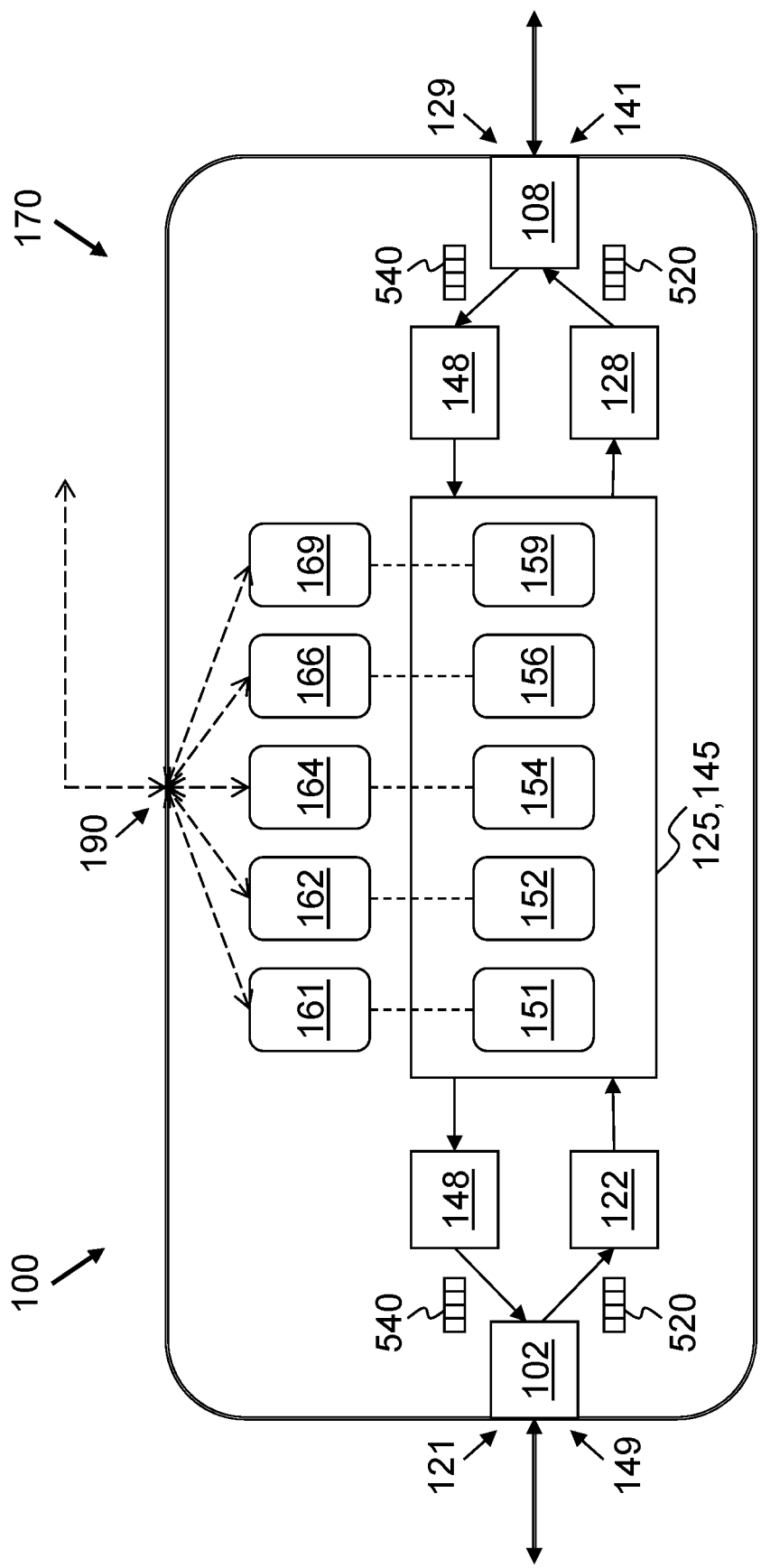
FIG. 4 schematically shows some details of an interface according to an embodiment.

FIG. 4 schematically shows some details of an interface 100 and/or a connection system 170 according to an embodiment. In this embodiment, the interface is bidirectional; thus non-TSN ports 121, 149 and TSN ports 129, 141 may be implemented as one port, each. These ports are connected to a PHY-conversion 102, 108, respectively. Buffers 122, 148 and 129, 141 are connection to the respective PHY-conversions 102, 108. First data packets 520 (not TSN-compliant) and second data packets 540 (TSN-compliant) are fed into the respective transforming sub-devices or transformation engine 125, 145, for transforming from TSN to non-TSN domain and back. This transformation engine may comprise header remap component 151, footer remap component 159, clock component 152 (comprising HW- and SW-components, and including a microcontroller unit, MCU, which is required to run .1AS clock), TAS and/or CBS shaper component 154 (for Credit-Based and Time-Aware Shaping of the traffic), and further transforming components 156. The upper part of interface 100 depicts configuration elements for the frame transformation. These configuration elements may comprise header remap configuration 161, footer remap configuration 169, clock adjustment configuration 162, TAS and/or CBS shaper configuration 164, and/or further transforming configurations 166. The configuration elements may be controlled by a user, e.g. remotely. The configuration elements may control the transformation engine 125, 145. The interface 100 may comprise SW and/or HW, such as an ASIC or an FPGA (e.g. to increase flexibility).

The functions of the interface may comprise following transformations on the data frame, from either side: Receiving the data frame; analysing the headers, including recognizing the frame type; modifying the headers and/or the content of the data frame, w.r.t. configuration for recognized specific frame type; recalculating footer/FCS; sending the data frame. The processing of clock sync frames may be different in case of non-PTP-compatible clocks in the non-TSN domain (see above): the .1AS clock sync frame may be fully consumed by the interface, while the ".1AS-to-non-.1AS" is sending its own frames to non-TSN domain with the time value of the local .1AS clock, therefore pulling the non-TSN clock to .1AS clock. It works similarly in reverse order.

Figure 5:
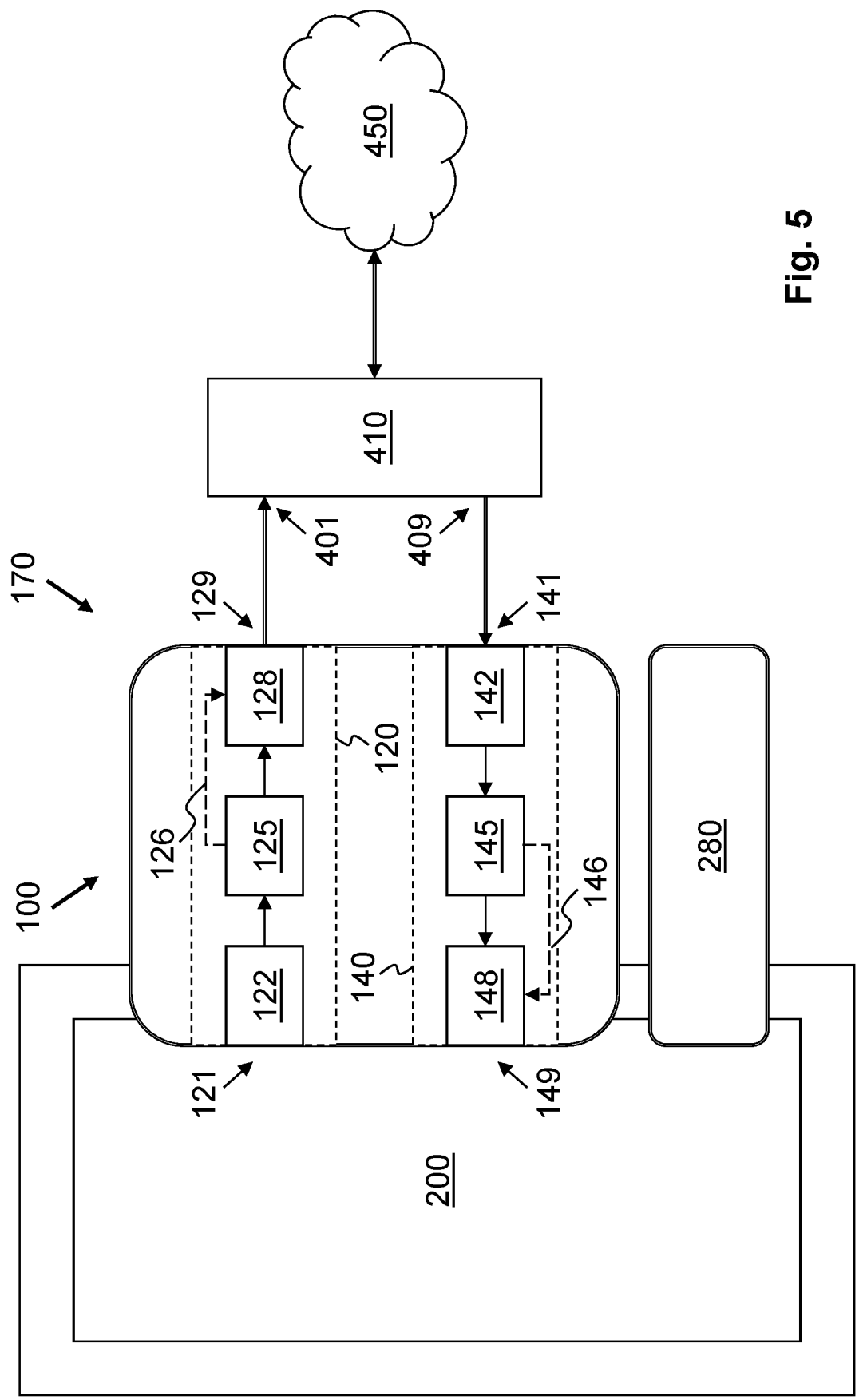
FIG. 5 schematically shows a non-TSN device with an additional plug-in slot extension according to an embodiment.

FIG. 5 schematically shows a non-TSN device 200 with an additional plug-in slot extension 280, which realizes a connection system 170 according to an embodiment. The connection system 170 is essential the same as described in as FIG. 1. The non-TSN ports 121 and 149 are sited within the non-TSN device 200. The non-TSN device 200 also comprises the further sub-device 280 sited in an additional slot.

Figure 6:
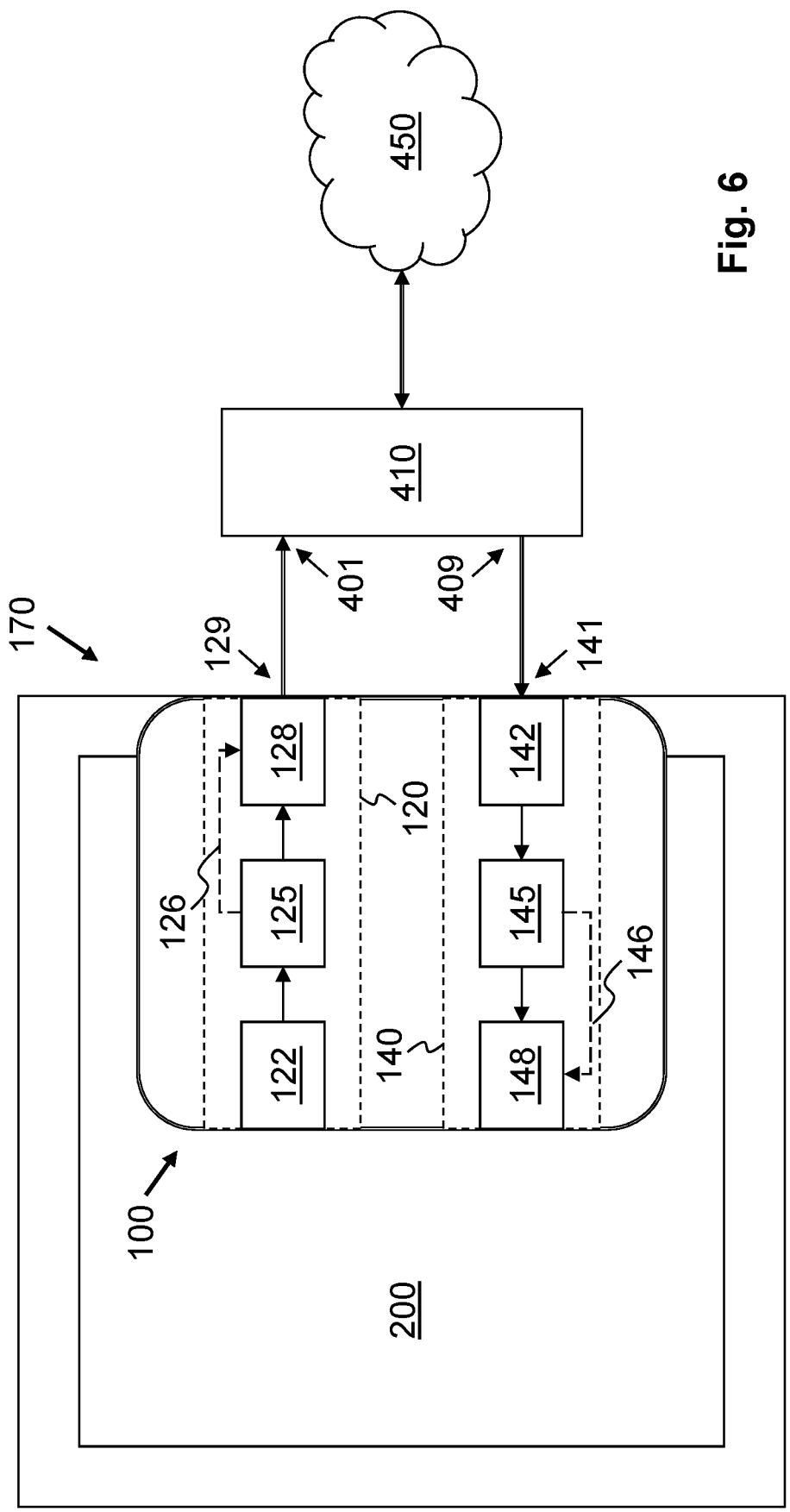
FIG. 6 schematically shows a non-TSN device with an embedded extension according to a further embodiment.

FIG. 6 schematically shows a non-TSN device 200 with an embedded extension, which realizes a connection system 170 according to a further embodiment. The TSN ports 129 and 141 are on the border of non-TSN device 200. Non-TSN ports 121 and 149 may be not accessible and/or otherwise "visible" from outside and are therefore not shown. This implementation may facilitate to access the non-TSN device 200 like a TSN device, i.e. in a transparent way.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS 100 interface
102, 108 PHY-conversion
120 receiving interface sub-device
121, 149 non-TSN ports
122 receiving input-buffer
125 first transforming sub-device
126 first control interface
128 receiving output-buffer
129, 141 TSN ports
140 sending interface sub-device
142 sending input-buffer
145 second transforming sub-device
146 second control interface
148 sending output-buffer
151 header remap component
152 clock component
154 TAS and/or CBS shaper component
156 further transforming components
159 footer remap component
161 header remap configuration
162 clock adjustment configuration
164 TAS and/or CBS shaper configuration
166 further transforming configurations
169 footer remap configuration
170 connection system
190 configuration interface
200 non-TSN device
201, 209 non-TSN ports
280 further sub-device
400 TSN-compliant device
401 TSN gateway input port
409 TSN gateway output port
410 TSN-compliant gateway
450 TSN network
520 first data packet
522 packet time
524 priority level
540 second data packet
542 packet time
544 priority level

What is claimed is:

1. A method for transmitting a first data packet from a receiving input-buffer to a receiving output-buffer, the first data packet in the receiving input-buffer has a non Time-Sensitive Network (TSN) format, wherein the non-TSN format is one of: Profinet, EtherCat, Powerlink, Ethernet/IP, TTEthernet, and/or Modbus TCP protocol, and the first data packet in the receiving output-buffer being TSN-compliant, the method comprising the steps of:
analysing the first data packet, which has been retrieved from a non-TSN device, in the receiving input-buffer;
adding a first data packet time to the first data packet according to a Precision Time Protocol (PTP);
adding a predefined first data packet priority level to the first data packet according to a Priority Code Point (PCP), of an 802.1Q tag;
transmitting the first data packet to the receiving output-buffer; and
sending the first data packet according to the first data packet priority level to a TSN-compliant device.

2. A non-transitory computer-readable storage medium comprising instructions, which, when executed by a computer and/or a controller, causes the computer and/or controller to carry out the method according to claim 1.

3. A method for transmitting a second data packet from a sending input-buffer to a sending output-buffer, wherein the second data packet in the sending input-buffer is Time-Sensitive Network (TSN) compliant and the second data packet in the sending output-buffer has a non-TSN format, wherein the non-TSN format is one of: Profinet, EtherCat, Powerlink, Ethernet/IP, TTEthernet, and/or Modbus TCP protocol, the method comprising the steps of:
analysing the second data packet, which has been retrieved from a TSN-compliant device, in the sending input-buffer, wherein the second data packet comprises at least a second data packet time and a second data packet priority level;

acknowledging the second data packet according to the second data packet priority level;

modifying the second data packet priority level from the second data packet according to the Priority Code Point (PCP);

modifying the second data packet time from the second data packet according to the Precision Time Protocol (PTP);

transmitting the second data packet to the sending output-buffer; and sending the second data packet to a non-TSN device.

4. A non-transitory computer readable storage medium comprising instructions, which, when executed by a computer and/or a controller, causes the computer and/or controller to carry out the method according to claim 3.

5. An interface between a communication layer of a Time-Sensitive Network (TSN) device and a communication layer of a non-TSN device, wherein a format of the non-TSN device is one of: Profinet, EtherCat, Powerlink, Ethernet/IP, TTEthernet, and/or Modbus TCP protocol, the interface comprising at least one of:

a receiving interface sub-device comprising a receiving input-buffer, a receiving output-buffer, and a first transforming sub-device, wherein the receiving interface sub-device is configured to transmit a first data packet from the receiving input-buffer to the receiving output-buffer by the first transforming sub-device, the first transforming sub-device being configured to execute a method for transmitting the first data packet from the receiving input-buffer to the receiving output-buffer, the first data packet in the receiving input-buffer having the non-TSN format and the first data packet in the receiving output-buffer being TSN-compliant, the method comprising the steps of:

analysing the first data packet, which has been retrieved from the non-TSN device, in the receiving input-buffer;

adding a first data packet time to the first data packet according to a Precision Time Protocol (PTP);

adding a predefined first data packet priority level to the first data packet according to a Priority Code Point (PCP) of an 802.1Q tag;

transmitting the first data packet to the receiving output-buffer; and sending the first data packet according to the first data packet priority level to the TSN device; and/or a sending interface sub-device comprising a sending input-buffer, a sending output-buffer, and a second transforming sub-device, wherein the sending interface sub-device is configured to transmit a second data packet from the sending input-buffer to the sending output-buffer by the second transforming sub-device, the second transforming sub-device being configured to execute a method for transmitting the second data packet from the sending input-buffer to the sending output-buffer, wherein the second data packet in the sending input-buffer is TSN-compliant and the second data packet in the sending output-buffer has the non-TSN format, the method comprising the steps of:

analysing the second data packet, which has been retrieved from the TSN device, in the sending input-buffer, wherein the second data packet comprises at least a second data packet time and a second data packet priority level;

acknowledging the second data packet according to the second data packet priority level;

modifying the second data packet priority level from the second data packet according to the Priority Code Point, PCP;

modifying the second data packet time from the second data packet according to the Precision Time Protocol, PTP, transmitting the second data packet to the sending output-buffer, and sending the second data packet to the non-TSN device.

6. The interface of claim 5, wherein the first data packet in the receiving output-buffer of the receiving interface sub-device is assigned a predefined first data packet priority level of 6.

7. The interface of claim 5, further comprising:

a clock-synchronisation to the non-TSN device that is configured to receive the second data packet from the sending output-buffer, wherein the clock-synchronisation to the non-TSN device is performed by means of a PTP master-slave function.

8. The interface of claim 5, further comprising:

a real-time capable arbitration system towards a TSN device, wherein the real-time capable arbitration system is TSN-compliant.

9. The interface of claim 5, further comprising:

a configuration interface, wherein the configuration interface is configured to configure the receiving interface sub-device and/or the sending interface sub-device.

10. A connection system for providing a connection between a TSN-compliant device and a non-TSN device, comprising:

at least one TSN port, at least one non-TSN port; and an interface according to claim 5.

11. A method, comprising:

using the system according to claim 10 for connecting a non-TSN device to a TSN device that supports TSN-compliant networking.

12. A method, comprising:

using the interface according to claim 5 for connecting a non-TSN device to a TSN device that supports TSN-compliant networking.

* * * * *